L. CHAPMAN.
Rolling-Colter.
No. 225,743. Patented Mar. 23, 1880.
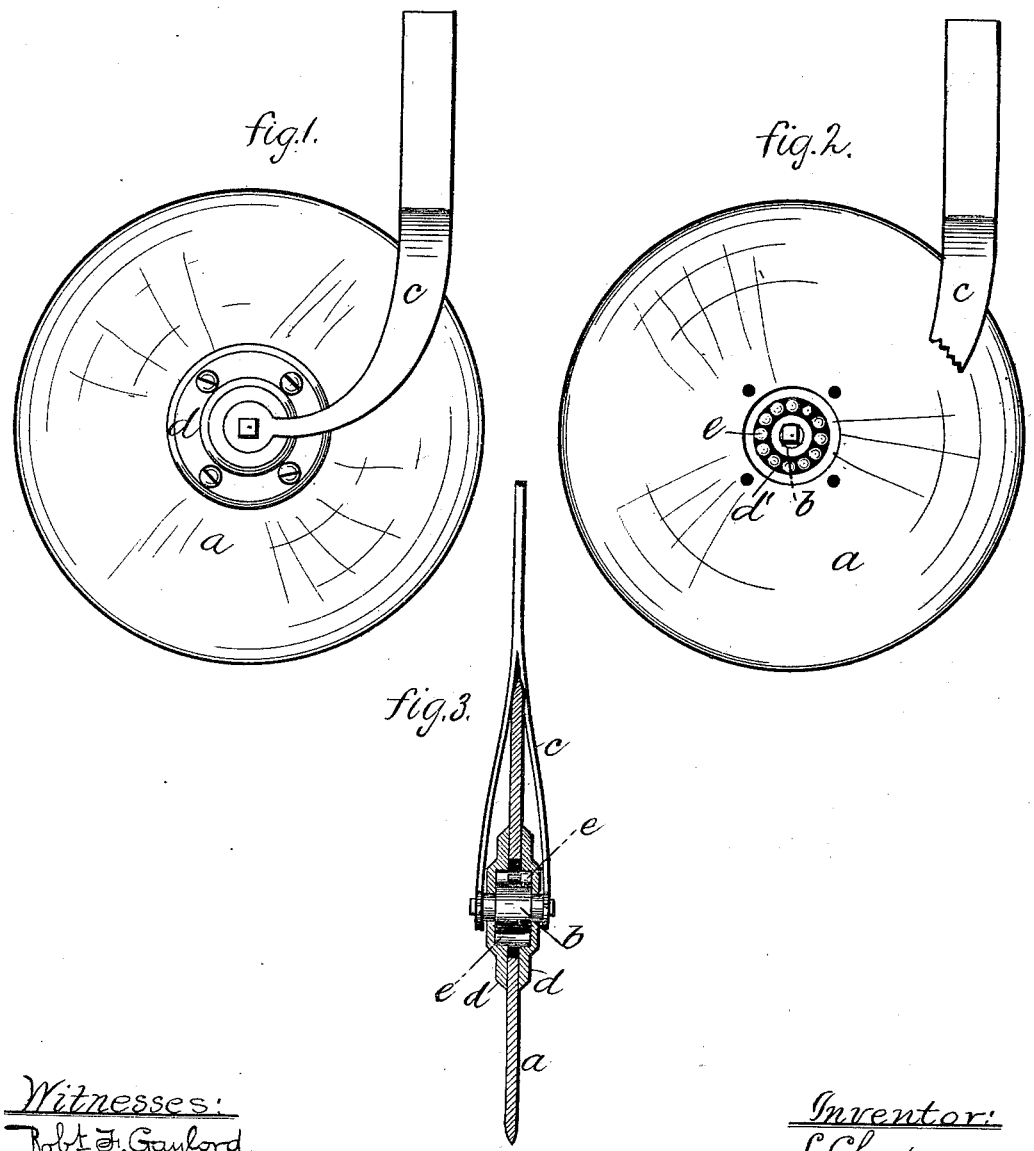
Witnesses:
Robt. F. Gaylord
A. Davies Smith
Inventor:
L. Chapman
By W. E. Simonds
Atty

UNITED STATES PATENT OFFICE.

LUKE CHAPMAN, OF COLLINSVILLE, CONNECTICUT, ASSIGNOR OF ONE-HALF OF HIS RIGHT TO THE COLLINS COMPANY, OF SAME PLACE.

ROLLING COLTER.

SPECIFICATION forming part of Letters Patent No. 225,743, dated March 23, 1880.

Application filed October 1, 1879.

To all whom it may concern:

Be it known that I, LUKE CHAPMAN, of Collinsville, in the county of Hartford and State of Connecticut, have invented certain new and useful Improvements pertaining to Rolling Colters for Plows, of which the following is a specification, reference being had to the accompanying drawings, where—

Figure 1 is a side view. Fig. 2 is a side view with one cap of the roller-recess removed and with one of the tines of the forked supporting-bar removed. Fig. 3 is a view in central vertical section.

The object and purpose of the invention is the diminution and removal, so far as is practicable, of the friction on the bearing parts of rolling colters.

The letters $a$ denote the steel disk, which is the colter proper. $b$ denotes the round non-rotating shaft, its central part enlarged and shouldered, and its ends squared to fit into the square orifice in the tines of the bifurcated bar $c$, by which the colter is attached to the plow-beam.

$d\ d$ denote two caps or collars, which are screwed to the sides of the disk $a$, which rotate on the smaller parts of the shaft $b$, and which are formed with recess $d'$, to receive and contain the enlarged part of the shaft $b$, and also the friction-rollers $e$, which are round and lie in said recess, and both rotate on their own axis and roll on the surface of the shaft as the colter rotates, with the effect of greatly diminishing friction. Every alternate one of these rollers has its central part diminished in size, as shown in the uppermost one of the two rollers seen in Fig. 3.

It is obvious that one of the caps $d$ might be made integral with the disk $a$.

I claim as my invention—

In combination, in a plow-colter, the colter-disk $a$, the shaft $b$, having its central part enlarged and shouldered, the suspensory bar $c$, the recessed caps $d\ d$, attached to the disk and bearing inwardly against the shoulders on the shaft, and the friction-rolls $e\ e$, abutting at their ends against the caps, all substantially as herein shown and described.

LUKE CHAPMAN.

Witnesses:
WM. E. SIMONDS,
R. F. GAYLORD.